United States Patent [19]

Neefe

[11] Patent Number: 4,659,522
[45] Date of Patent: Apr. 21, 1987

[54] METHOD OF SPIN CASTING AN OPHTHALMIC DEVICE WITH A CENTRAL APERTURE

[76] Inventor: Charles W. Neefe, 811 Scurry, P.O. Box 429, Big Spring, Tex. 79720

[21] Appl. No.: 891,122

[22] Filed: Jul. 31, 1986

Related U.S. Application Data

[63] Continuation-in-part of Ser. No. 751,484, Jul. 3, 1985, which is a continuation-in-part of Ser. No. 740,569, Jun. 3, 1985, Pat. No. 4,637,791, which is a continuation-in-part of Ser. No. 642,114, Jul. 17, 1984, Pat. No. 4,534,915, which is a continuation-in-part of Ser. No. 506,873, Jul. 5, 1983, abandoned, which is a continuation-in-part of Ser. No. 417,641, Sep. 9, 1982, Pat. No. 4,416,837.

[51] Int. Cl.⁴ ............................................. B29D 11/00
[52] U.S. Cl. ......................................... 264/2.1; 8/507; 264/1.1; 264/311; 351/160 R; 351/162; 425/425; 425/808
[58] Field of Search ................. 264/1.1, 2.1, 2.7, 311; 425/425, 808; 351/162, 165, 160 R, 160 H; 8/507

[56] References Cited

U.S. PATENT DOCUMENTS 2,241,415  5/1941  Moulton ............................. 425/808
3,496,254  2/1970  Wichterle ........................... 264/2.1
4,157,864  6/1979  Koller et al. ..................... 351/160 H Primary Examiner—James Lowe

[57] ABSTRACT

A method of making a spin cast contact device having a circular aperture in the center. The central aperture has a thin tapered inner edge. A spin cast concave mold having a raised central area provides the aperture with thin tapered edges. The device is a non-optical plano in the center and provides color enhancement to the eye.

14 Claims, 3 Drawing Figures

METHOD OF SPIN CASTING AN OPHTHALMIC DEVICE WITH A CENTRAL APERTURE

This is a continuation in part of patent application Ser. No. 751,484, filed 07/03/85, entitled: "A Spin Cast Lens with Central Aperture", which is a continuation in part of Ser. No. 740,569, filed 06/03/85, entitled: "A Gyroscopically Stabilized Spin Cast Machine", now U.S. Pat. No. 4,637,791 which is a continuation in part of patent application, Ser. No. 642,114, filed 07/17/84, entitled: "Method of Controlling the Ultraviolet Polymerization of Spin Cast Lenses", now U.S. Pat. No. 4,534,915, which is a continuation in part of Ser. No. 506,873, filed 07/5/83, entitled: "Improvements in Spin Casting Hydrogel Lenses", now abandoned, which is a continuation in part of Ser. No. 417,641, filed 09/09/82, entitled: "Simplified Improvements in Spin Casting", now U.S. Pat. No. 4,416,837.

PRIOR ART

Koller, U.S. Pat. No. 4,157,864, discloses a hard central contact surrounded by a soft peripheral flange, having an inner edge thickness of 0.30 milimeters to hold the hard contact lens in position.

Wichterle, U.S. Pat. No. 3,679,504, discloses a colored soft contact lens.

U.S. Pat. No. 3,710,796 discloses a "Corneal Drug Delivery" method. U.S. Pat. No. 3,786,812 also describes a "Contact Lens for Ocular Drug Delivery". U.S. Pat. No. 4,460,523 describes a "Method of Making Cosmetic Contact Lenses". U.S. Pat. No. 4,472,327 describes a "Method of Making Hydrogel Cosmetic Contact Lenses".

The art of spin casting contact lenses has been in use for nineteen years. The principal value of spin casting is its low labor cost and high production. The exact shape of a spin cast surface is most difficult to describe due to its being formed by several forces including centrifugal force, surface tension, gravity and radius of the concave mold. Also, the lens monomer undergoes changes during polymerization. These changes include shrinkage, increase in viscosity, gelation, exotherm and solidification. It is desirable to start polymerization at the center and proceed toward the edge. In spin casting the reverse has been true. The edge of the concave lens surface being slightly nearer the ultraviolet light source polymerizes before the central area.

STATE OF THE ART

The most simple case of the spinning surface occurs when the surface tension can be neglected. In this case the spinning surface is a paraboloid which in cylindrical coordinates (z,r) is described by the equation:

$$z = \frac{w^2 r^2}{2g}$$

$w = 2\pi n$, $n =$ spin speed, and $g =$ gravitational constant:

Actual spin casting involves a combination of the static and spinning cases. The equation describing the spinning fluid surface contains separate terms relating to the stationary and spinning states:

$$z = \frac{w^2 r^2}{2g} + \frac{a}{pg} \quad \frac{1}{R_1} + \frac{1}{R_2}$$

$a =$ surface tension
$p =$ density
$R_1 =$ radius of osculatory sphere at (r,z)
$R_2 =$ radius of meriodional sphere at (r,z)

With the monomer formulation in the casting mold and the cover sealed, the motor is started and brought to the speed selected. The speed to be used is dependent upon the focal length of the paraboloid surface desired according to the formula:

$$f = \frac{g}{2w^2}$$

where the focal length is in m/m, the gravitational acceleration constant is in m/m/sec$^2$, and the rotational velocity is in radians/sec.

This formula may be developed by considering the forces acting on the liquid. A body of liquid lying at rest will form a surface normal to the force of gravity acting upon it. In the same manner, if a liquid is held in a container which is rotated about a veritcal axis, a surface will be formed which is everywhere normal to the resultant force acting on each surface element.

Vibrations produce standing waves on the surface of the liquid lens monomer. This must not be allowed if optical surfaces are to be obtained. Large heavy machines anchored to concrete pillars have been used to reduce vibration.

The concave mold must also rotate about a stable center of rotation if true surfaces are to be obtained.

IN THE DRAWINGS

SUBJECT OF THE INVENTION

Contact lenses have been used to alter the apparent color of the eye. These lenses are intended for persons requiring visual refraction correction to obtain good visual acuity. The lenses are medical devices for visual correction and are subject to premarket approval by the Food and Drug Administration. The current lenses are not intended for use by the large percentage of the population who do not need or want visual correction. The cosmetic enhancement of the eye color does not require a visual refractive correction.

The delivery of medications to the eye also does not require a visual refractive correction.

The manufacture of plano or zero power contact lenses is most difficult and expensive. A solution has been found by making the lens with an open central aperture. The aperture being to 2.0 milimeters to 6.0 milimeters in diameter. The edges of the central aperture must be tapered thereby, thinning the lens around the aperture to a thickness of 0.005 milimeters to 0.08 milimeters. The edge thinning also provides a comfortable lens and minimum of foreign body sensation as the eye lid travels over the aperture during the blink. A thick aperture edge will result in an upward displacement of the device upon blinking.

The opening to the atmosphere at the lens center prevents hypoxia and the formation of edema. The non-refraction aperture lens can be tolerated for extended periods of time without the problems encountered with refractive lenses. The materials used may be stronger and more durable since no consideration of oxygen permeability is required.

The aperture device may be tinted by dying or by adding the colorant to the liquid monomer before polymerization. The aperture non-refractive device is made from any of the available soft contact lens materials. Materials which are translucent and cannot be used for refractive lenses may also be used since the central visual area is an open aperture. The material surrounding the central hole must provide comfort and the desired color for cosmetic enhancement.

For use as a drug delivery vehicle the aperture device requirements are, comfort and the ability to release the medication at the prescribed and predetermined rate.

THE APERTURE NON-REFRACTIVE DEVICE IS SPIN CAST AS FOLLOWS

Figure 1:
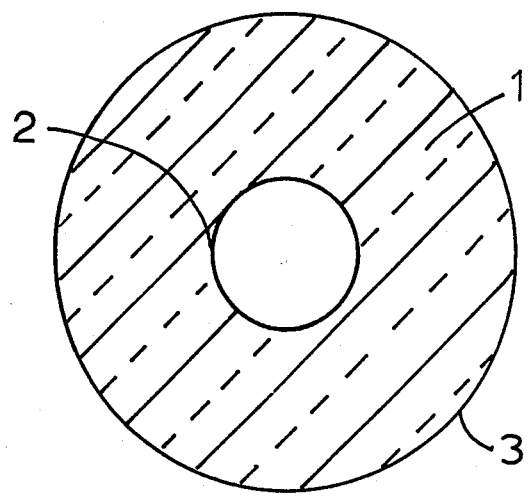
FIG. 1 shows the aperture lens from the front.
Figure 2:
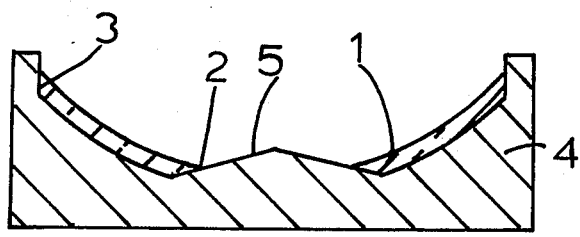
FIG. 2 shows the aperture lens in the spin cast mold in section.
Figure 3:
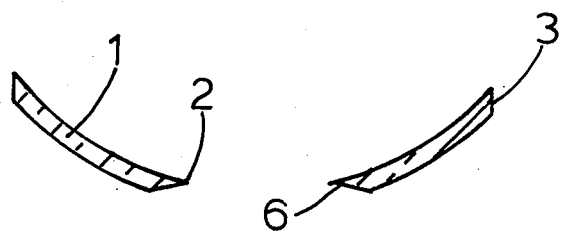
FIG. 3 shows the aperture lens in section.

A concave spin casting mold, 4 FIG. 2, shown in section is provided. The mold has a convex conical protrusion, 5 FIG. 2, in the center. A liquid monomer, 1 FIG. 2, is spin cast around the convex protrusion, 5 FIG. 2. The monomer, 1 FIG. 2, is allowed to polymerize to form a solid device having a circular hole in the center formed around the convex central protrusion. The edge of the circular central aperture, 6 FIG. 3, is tapered forming a thin inner edge, 2 FIGS. 1, 2 and 3, around the central open aperture. The lens, 1 FIG. 2, is removed form the spin cast mold, 4 FIG. 2. FIG. 1 shows the lens from the front, 1 FIG. 1, the lens body, 2 FIG. 1, the edge of the central aperture, 3 FIG. 1, being the outer edge of the lens. The outer edge, 3 FIGS. 1 and 3, may be shaped as desired for comfort. FIG. 3, shows the lens in section, 1 FIG. 3, the lens body, 2 FIG. 3, the edge of the central circular aperture, 6 FIG. 3, being the sloping edge of the central aperture. The surface, 6 FIG. 3, may also be a curve which eliminates the junction with the convex surface, 3 FIG. 3, the edge of the lens is removed from the spin cast mold.

Examples of colorants added to the monomer are: FD and C Green #6, Leeben Color Blue LS-589, Brown LS-595 Green 16128 and Violet LS-611.

The acid dyes, known as azo dyes, containing nitrogen to nitrogen bonds —N═N—may be used to practice the invention as may the dyes known as reactive dyes and the sulphur dyes. The sulphur dyes are fixed or made fast be removing the solium sulphide which made the dye soluble. Reactive dyes require no special fixing step, only extraction of unreacted dye, as they react chemically with the device material and are thus made permanent. The properties of dyes are well known to the art.

Examples of the monomer mixture are:

| | |
|---|---|
| (1) Ethylene glycol monomethacrylate | 64.8% |
| Diethylene glycol monomethacrylate | 7.056% |
| Ethylene glycol dimethacrylate | 0.144% |
| Water | 20.9% |
| Ammonium persulfate | 1.1% |
| 2-dimethylaminoethyl acetate | 6.0% |
| (2) Ethylene glycol monomethacrylate | 54.7% |
| Diethylene glycol monomethacrylate | 17.2% |
| Diethylene glycol dimethacrylate | 0.6% |
| Ammonium persulfate | 1.1% |
| Dimethylaminoethyl acetate | 5.8% |

Antimicrobial agents may be added to the monomer before polymerization and locked into the polymeric structure of the device. These agents prevent the growth of microorganisms on the surface and eliminate the need for disinfecting. Examples of useful antimicrobial agents are: 3-(trimethoxysilyl) propylocta decyldimethyl ammonium cloride, known as Dow Corning 5700 and hexachlorophene.

It should be understood that the invention is not limited to the exact details of construction shown and described herein for obvious modifications will occur to persons skilled in the art.

I claim:

1. A method of making a corneal device having an open aperture by the steps of providing a concave spin casting mold having a centrally located convex protrusion, placing a liquid monomer in the concave spin casting mold, rotating the spin casting mold around its' central axis, allowing the liquid lens monomer to form a concave surface surrounding the central convex protrusion, allowing the rotating liquid monomer to polymerize forming a corneal device having an open central aperture formed around the convex protrusion in the center of the concave spin cast mold, removing the corneal device having an open central aperture from the concave mold.

2. A method of spin casting a corneal device having a central open aperture by the steps of providing a concave spin casting mold having a centrally located convex cone, placing a liquid monomer in the concave spin casting mold, rotating the concave spin cast mold around the central axis of the concave mold and the convex centrally located cone, allowing the surface of the rotating liquid monomer to assume a concave shape surrounding the central convex cone, allowing the rotating liquid lens monomer to polymerize forming a solid open aperture corneal device, removing the corneal device having an open central aperture from the spin casting mold.

3. A method of making a corneal eye color change device with an open central aperture having an edge thickness of 0.005 milimeters to 0.08 milimeters by the steps of providing a concave spin casting mold having a centrally located convex cone shaped protrusion, placing a selected liquid monomer in the concave mold, rotating the concave spin cast mold around the central axis of the cone shaped central protrusion, the rotating selected liquid monomer forms a concave surface around the convex cone shaped central protrusion, allowing the rotating selected monomer to polymerize, forming a solid open aperture corneal device around the central convex cone shaped protrusion, allowing the rotation to cease, removing the corneal device having an open central aperture from the concave spin casting mold.

4. The subject matter set forth in claim 1 wherein a colored dye is applied to the finished lens.

5. The subject matter set forth in claim 2 wherein a colored dye is applied to the finished lens.

6. The subject matter set forth in claim 3 wherein a colored dye is applied to the finished lens.

7. The subject matter set forth in claim 1 wherein a colorant is added to the liquid monomer before the liquid monomer is polymerized to form a lens.

8. The subject matter set forth in claim 2 wherein a colorant is added to the liquid monomer before the liquid monomer is polymerized to form a lens.

9. The subject matter set forth in claim 3 wherein a colorant is added to the liquid monomer before the liquid monomer is polymerized to form a lens.

10. The subject matter set forth in claim 1 wherein the edge of the central open aperture has a thickness of 0.005 milimeters to 0.08 milimeters.

11. The subject matter set forth in claim 2 wherein the edge of the central open aperture has a thickness of 0.005 milimeters to 0.08 milimeters.

12. The subject matter set forth in claim 1 wherein the lens is made from a translucent material.

13. The subject matter set forth in claim 2 wherein the lens is made from a translucent material.

14. The subject matter set forth in claim 3 wherein the lens is made from a translucent material.

* * * * *